Sept. 29, 1964   J. W. NELSON   3,150,870
CLAMPING TOOL
Filed March 17, 1961
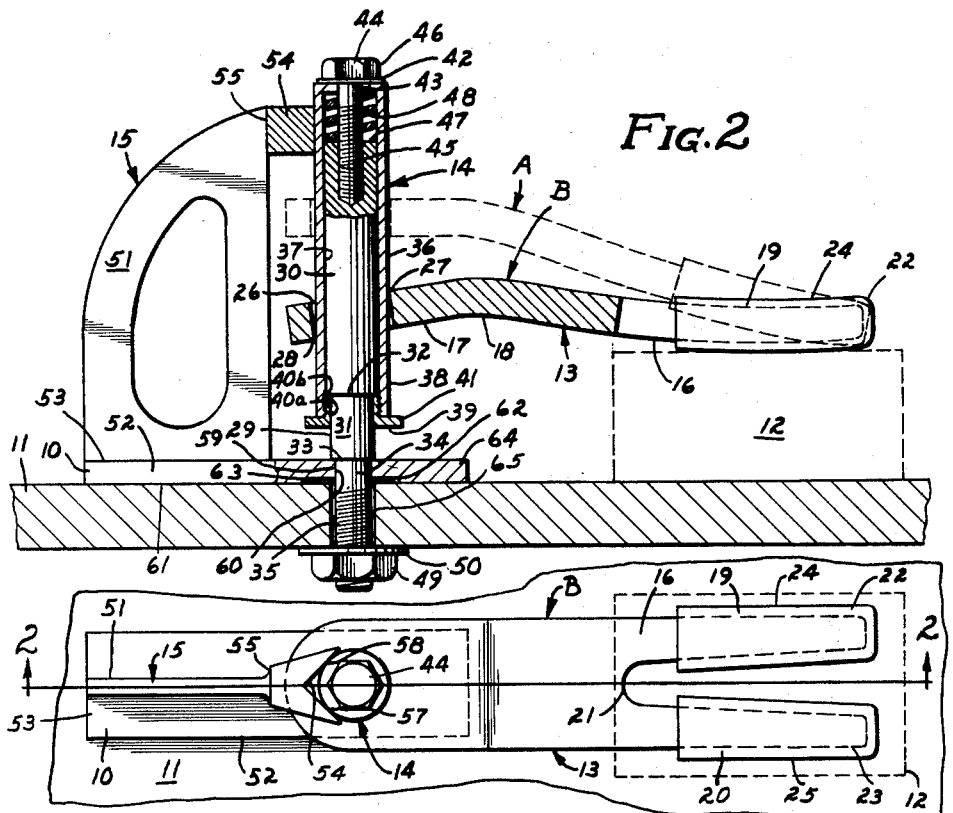
Fig. 2
Fig. 1
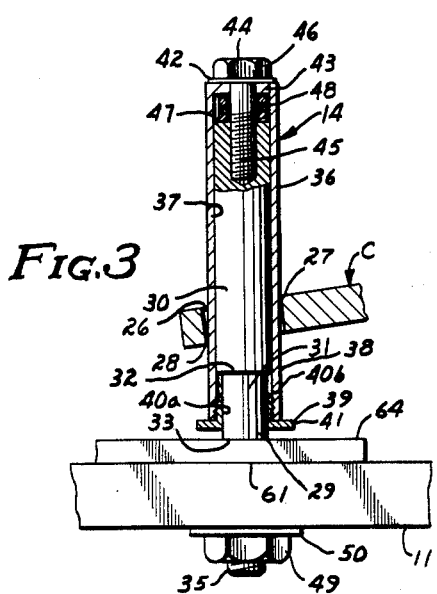
Fig. 3
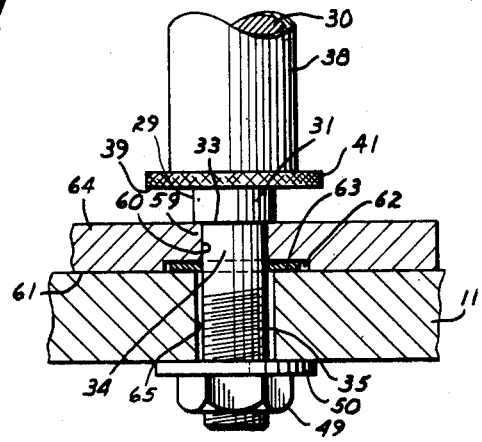
Fig. 4
INVENTOR.
JOHN W. NELSON
BY
ATTORNEY United States Patent Office 3,150,870
Patented Sept. 29, 1964

3,150,870
CLAMPING TOOL
John W. Nelson, 3226 15th Ave. S.,
South Minneapolis, Minn.
Filed Mar. 17, 1961, Ser. No. 96,467
7 Claims. (Cl. 269—91)

This invention relates to mechanical machines and more particularly to a clamping device.

An important object of this invention is to provide a clamping device for firmly holding materials to a working table during a machining process or the like.

Another important object is to provide a clamping device as described above which stresses simplicity of design and economy of fabrication.

A further object of this invention is to provide a clamping means as stated above which is operable with a minimum of time, effort and skill.

A problem known to those skilled in the art of machining small sized materials is that of securing the material to be machined to the work bench or table. The usual problem is to exert enough vertical force on the material to hold it to the table top and prevent slippage and at the same time avoid cumbersome clamps which are likely to get in the way, during the machining operation, of either the operator or tools which he is using. Through my device I have been able to accomplish these desired results in addition to providing such a clamping means for materials of irregular shapes.

These and other objects and advantages of my invention will more fully appear from the following description, made in connection with the accompanying drawing, wherein like reference characters refer to the same or similar parts throughout the several views and in which:

FIGURE 1 shows a top view of my invention mounted on a fragment of a work bench or platform;

FIGURE 2 is a cross sectional side view of FIGURE 1 taken at section 2—2, portions of FIGURE 2 being in full line drawing;

FIGURE 3 is a fragmentary view of the post and surrounding elements similar to that of FIGURE 2, the sleeve portion being lowered to effect clamping force on the arm; and FIGURE 4 is a detailed enlarged segment of the lower stem structure showing portions thereof in full line drawing.

Referring now more particularly to FIGURE 1, I show a top view of my clamping tool referred to generally as 10 as it is mounted on a table or platform 11 and having a work piece 12 clamped between the clamping tool 10 and the table 11. As may be seen in FIGURE 1 and FIGURE 2, my clamping tool comprises three basic elements; namely, the angulated clamping arm 13, the bearing post 14 and a handle brace 15.

In greater detail, the angulated clamping arm 13 is formed from a single piece of strong material having an outwardly extending bifurcated end 16 and a wedging end 17 with a bend 18 intermediate the bifurcated and wedging ends as shown in FIGURE 2. The bifurcated end has two fingers 19 and 20 joined at curved portion 21 and formed by cutting out a portion as shown in FIGURE 1 leaving an open space defined between the fingers. The ends 22 and 23 of fingers 19 and 20 respectively are covered with protective coverings 24 and 25. The covers protect the work piece 12 from any marring or scratching. These protective covers may be any material such as a soft metal like copper, or a resilient material such as rubber or leather or even a plastic material such as nylon. Through the bifurcation of the clamping arm 13, the work piece 12 may be so held that a hole may be drilled between the fingers 19 and 20 or any other similar operation performed. It also provides a smaller clamping area for small pieces of material when only one of the fingers is used.

Bend 18 can be any small angle for it is not critical to the operation of the device. As shown in FIGURE 2, the finger end of arm 13 has a slight reverse bend so as to provide a substantially flat bearing surface on the material 12 when a force is exerted by the rest of the tool, as will subsequently become apparent.

Wedging end 17 is provided with a hole 26 for loosely fitting around the bearing post 14. In operation, the wedging hole will have a fore bearing edge 27 and a rear bearing edge 28 as will be explained subsequently.

Bearing post 14 consists of a main stem member 29 having an upper guide post 30, a reduced mid-portion 31, extending between shoulders 32 and 33 and a further reduced lower portion 34 which terminates downwardly in a threaded portion 35. Held in sliding engagement to the guide post 30 of stem 29 is the bearing sleeve 36 which has an axial bore 37 to receive the guide post 30. Held in frictional engagement at the lower end 38 of bearing sleeve 36 is bushing 39. This bushing 39 in turn has a central bore 40a which receives the reduced mid-portion 31 of stem 29 in sliding engagement. The upper end 40b of bushing 39 is shown seated against shoulder 32. Bushing 39 also has a knurled edge 41 (FIGURE 4) which the operator may grasp to prevent rotation of sleeve 36 upon the tightening of the bolt located at the upper end of bearing post 14.

On the upper end of bearing sleeve 36 and forming a part thereof is an end face 42 having a circular opening 43 axially aligned with the bearing sleeve 36 for slidably receiving bolt 44. Bolt 44 in turn has a threaded portion 45 which upon rotation of head 46 will engage into guide post 30 thereby drawing the end face 42 toward the upper end 47 of the guide post 30. Interposed between the end face 42 of sleeve 36 and upper end 47 of guide post 30 is a compression spring 48 which encircles the upper portion of threaded part 45 of bolt 44.

Secured to the lower threaded portion 35 of stem 30 is a nut 49 and washer 50 whose functions will be explained subsequently.

An important part of this invention lies in the design of handle brace 15 and its operable relation to the angulated clamping arm 13 and bearing post 14. Handle brace 15 is constructed having three parts, the handle grip 51, horizontal base 52 and cradle 54. The handle grip 51 is positively and rigidly secured to the base 52 at right angles to the base along joint 53. Also rigidly secured to the handle grip 51 is the cradle 54 along joint 55. Cradle portion 54 is simply formed by cutting a recess or notch 56 in the side opposite the handle 51, as shown in FIGURE 2, whereby bearing faces 57 and 58 are provided (FIGURE 1). Base 52 has a hole 59 drilled therethrough and has a bore 60, as shown in greater detail in FIGURE 4, for receiving, in close clearance, the threaded portion 35 of stem 29. Located on the under side 61 of base 52, and concentric with respect to hole 59, is a shallow recess 62, circular in shape. This recess retains a lock washer 63 for when shoulder 33 is drawn tightly against the upper surface 63 of base 52.

FIGURE 3 shows a partial view of FIGURE 2 wherein the bearing sleeve 36 has been forced downwardly over stem 29 by means of bolt 44. In this view it is noted that spring 48 has been contracted against the drawing force of the bolt 48 whereby a greater wedging force is applied by fore and rear bearing edges, 27 and 28, or bearing sleeve 36.

FIGURE 4 shows an enlarged side view of the means for attaching the clamping tool 10 to a table 11, having an opening 65, wherein the lock washer 63 is shown substantially flattened under the vertical force exerted by nut 49 threadably drawing shoulder 33 tightly down upon upper surface 64 of base 52.

In the use and operation of my clamping tool, I first attach the stem 29 through the base hole 59 to a table 11 which has an opening 65. As may be seen in more detail in FIGURE 4, the base 52 of the clamping tool 10 is firmly held against the table 11 by drawing the shoulder 33 tightly down upon the upper surface 64 of base 52 by simply tightening the nut 49. At this point the stem 29 will be in a vertical position with the handle brace base 52 held in substantially fixed and flat position with the table 11 and with the upper end of bearing sleeve 36 lightly resting against the cradle 54 at edges 57 and 58 as shown in FIGURE 1. Without a work piece 12 positioned below the clamping arm fingers 19 and 20, the clamping arm 13 is free to fall or rotate about the bearing sleeve 36, as shown by position "A" of FIGURE 2, because of the appreciable clearance between the inside of clamping arm hole 26 and the outside diameter of bearing sleeve 36. Without a block of material below the fingers, the bolt 44 is also in a retracted position thereby allowing the bearing sleeve 36 to retract upwardly under the pressure of spring 48 until the upper end 40b of bushing 39 abuts against shoulder 32.

Assuming now that the operator desired to drill a hole in a small work piece 12, the piece would be placed as shown in FIGURE 2 below the clamping arm 13 and centrally positioned below the fingers 19 and 20 as shown in FIGURE 1. At this point, the clamping arm would have a position as shown by the dotted line position "A" of FIGURE 2. Next, the wedging end 17 of the clamping arm 13 would be manually forced downwardly by the operator to a position shown in FIGURE 2 at position "B," which operation would exert an initial force down upon the work piece 12 by means of fingers 19 and 20. It is noticed at this time that by the difference in the clamping arm hole 26 size and outside diameter of the bearing sleeve 36, a certain amount of wedging action takes place already at bearing edges 27 and 28 which will hold the two members 13 and 36 in wedged fashion as shown in FIGURE 2. To further increase the vertical pressure upon work piece 12, the bolt 44 is turned so as to overcome the tension of spring 48 and resisting force exerted upward on the fingers by the block 12, thereby drawing the bearing sleeve downwardly about the stem upper guide post 30 and reduced mid-portion 31. As the bearing sleeve 36 is drawn downwardly, it is noted that the bushing 39 provides a positive guide for the lower end 38 of the bearing sleeve 36 so that the wedging forces between the clamping arm 13 and bearing sleeve 36 will not be directly transferred in concentrated force to the guide post 30 and thereby increase frictional wear and excessive force thereon. When the bolt 44 has been rotated to the point of desired vertical force to be exerted on the work piece 12, the bearing post elements would have a relation as that shown in FIGURE 3, at position "C." The upper end 40b of bushing 39 is now displaced from shoulder 32 by the amount that end face 42 has been drawn toward the upper end 47 of guide post 30.

As the bolt 44 is actuated to cause a greater wedging force on the clamping arm 13 as described above, a natural resulting torque will be applied to the bearing post 14 as a unit. To counteract this torque, I have provided the cradle 54 on handle grip 51 which the upper end of bearing sleeve 36 will rest against. To prevent the binding post from deviating from its perpendicular position, the cradle is firmly attached to the handle grip 51 so as to transfer torque forces through the handle to the base plate 52. It is now noted that since the base plate has been rigidly attached to the table 11, the torque force will be counteracted by the handle brace 15 and the binding post 14 thereby kept in its vertical position.

When the work piece 12 has been machined or drilled and otherwise completed, it will be a very simple operation to withdraw the bolt from the upper end of guide post 30 and thereby allow the spring 48 to raise the bearing sleeve 36 which in turn will reduce the wedging torque on the clamping arm 13.

Through my invention I have also provided for an increased flexibility in use by providing a bracing effect against torque forces as described above whenever the clamping arm is turned about the bearing post 14 at some degree from that shown in FIGURE 1. For example, with reference to FIGURE 1, the fingers 19 and 20 may be rotated clockwise or counterclockwise about bearing post 14 at some angle and the bracing effect of handle brace 15 will be substantially preserved. If substantial rotation of the fingers is required, nut 49 may be loosened, and handle brace 15 may then be swiveled about bearing post 14 such that the handle brace and clamping arm are again substantially aligned as in FIGURE 1.

Through my device, I have also provided for versatility of holding work pieces of varying thicknesses since my clamping means depends upon the relative relation of the bearing sleeve 36 to stem 29 irrespective of the vertical position of the clamping arm 13 on the bearing sleeve.

It will, of course, be understood that various changes may be made in the form, details, arrangements and proportions of the parts without departing from the scope of my invention as set forth in the appended claims.

What I claim is:

1. A clamping tool comprising a handle brace having an upstanding grip portion and a horizontal table contacting portion, a bearing post adapted to be secured through said horizontal table contacting portion to a table, a clamping arm slidably associated therewith, means mounted on said bearing post for applying vertical force upon said clamping arm, said grip portion engaging in bracing relation said bearing post during use.

2. A clamping tool comprising a handle brace having an upstanding grip portion and a horizontal table contacting portion, a bearing post adapted to be secured through said horizontal table contacting portion to a table, a clamping arm slidably associated therewith, means on said bearing post for applying vertical force upon said clamping arm, and a cradle secured to said grip portion between said bearing post and said grip portion for bracing reaction of torque forces exerted by said bearing post caused through operation of said tool.

3. A clamping tool comprising a handle brace having an upstanding grip portion and a horizontal table contacting portion with a mounting hole therethrough, a bearing post having a stem adapted to be secured through said table contacting portion to a table, a bearing sleeve interfitted over said stem and in sliding engagement therewith, means mounted on said stem in vertically adjustable abutment with said bearing sleeve, a clamping arm, one end thereof freely interfitting about said bearing sleeve for wedging thereagainst and the other end extending laterally outward thereupon and adapted to constitute with a table surface a holding element, said upstanding grip portion slidably abutting an upper portion of said bearing sleeve to brace the same whereby upon adjusting said means downwardly said bearing sleeve will be forced downwardly in braced relation with respect to said grip portion and thereby applying and maintaining vertical force on said clamping arm.

4. A clamping tool comprising a handle brace having a vertically positioned handle and a base secured to the lower end thereof and having a hole therethrough, a bearing post having a stem threadably secured through said base hole and adapted to be secured to a table, a bearing sleeve interfitted over said stem and in sliding engagement therewith, means engaging the upper end of said stem for drawing downwardly said bearing sleeve, an angulated clamping arm operating in co-operation with said bearing post whereby to exert vertical force by means of said clamping arm, and a cradle secured to the upper end of said vertically positioned handle and in abutting relation to said bearing post whereby to counteract forces exerted thereupon by said bearing post.

5. A clamping tool as set forth in claim 4 having a spring bias positioned between said bearing sleeve and said upper end of said stem, whereby said spring bias will retract said bearing sleeve upwardly upon release of said means engaging said upper end of said stem for drawing downwardly.

6. A clamping tool as set forth in claim 4 wherein said cradle comprises a block having a recess in one side thereof adjacent said bearing post.

7. A clamping tool comprising a handle brace having an upstanding grip portion and a horizontal table contacting portion with a mounting hole therethrough, a bearing post having a stem adapted to be secured through said table contacting portion to a table, a bearing sleeve interfitted over said stem, a bushing held in frictional engagement with said bearing sleeve and being in sliding engagement with the lower end of said stem, means mounted on said stem in vertically adjustable abutment with said bearing sleeve, a clamping arm, one end thereof freely interfitting about said bearing sleeve for wedging thereagainst and the other end extending laterally outward thereupon and adapted to constitute with a table surface a holding element, said upstanding grip portion slidably abutting an upper portion of said bearing sleeve to brace the same whereby upon adjusting said means downwardly said bearing sleeve will be forced downwardly in braced relation with respect to said grip portion and thereby applying and maintaining vertical force on said clamping arm.

References Cited in the file of this patent

UNITED STATES PATENTS

| | | |
|---|---|---|
| 1,131,869 | Schade | Mar. 16, 1915 |
| 2,157,345 | Nelson | May 9, 1939 |
| 2,726,693 | Saxton | Dec. 13, 1955 |
| 2,888,052 | Reason | May 26, 1959 |

FOREIGN PATENTS

| | | |
|---|---|---|
| 831,530 | Germany | Jan. 10, 1952 |